United States Patent
Takahashi

Patent Number: 5,430,570
Date of Patent: Jul. 4, 1995

[54] LIGHT DEFLECTOR

[75] Inventor: Masahiro Takahashi, Kanagawa, Japan

[73] Assignee: Fuji Xerox Co., Ltd., Tokyo, Japan

[21] Appl. No.: 94,222

[22] Filed: Jul. 21, 1993

[30] Foreign Application Priority Data

Jul. 22, 1992 [JP] Japan .................. 4-195624

[51] Int. Cl.⁶ .......................... G02B 26/08
[52] U.S. Cl. .................. 359/216; 359/217; 310/56; 310/61; 310/90.5; 310/267
[58] Field of Search .......... 359/216, 217; 310/56, 310/61, 90.5, 267

[56] References Cited

U.S. PATENT DOCUMENTS 5,172,021 12/1992 Takahashi et al. ............ 310/90.5

FOREIGN PATENT DOCUMENTS 62-231922 10/1987 Japan .
1-113218 7/1989 Japan .
3-039714 4/1991 Japan .
4-013919 2/1992 Japan .

*Primary Examiner*—Loha Ben
*Assistant Examiner*—Suma N. Ramaswamy
*Attorney, Agent, or Firm*—Finnegan, Henderson, Farabow, Garrett & Dunner

[57] ABSTRACT

The present invention provides a light deflector which effectively cools a rotation torque generation portion, which leads to miniaturization of the apparatus and economy of electric power. The light deflector according to the present invention having a rotating polygonal mirror having mirrors on its side faces, a rotation sleeve fixed to the rotating polygonal mirror, a magnet yoke including magnets fixed to the rotation sleeve, a fixed shaft inserted into the rotation sleeve, a housing supporting the fixed shaft, a stator core fixed to the housing and constituting an electromagnetic circuit by magnetically interacting with the magnet yoke to generate rotation torque, and a substrate on which the stator core is mounted and a part of which is extended outside through a substrate insertion slot, is characterized in that at least one air hole is formed at least in the magnet yoke between the magnet yoke and stator core and an air inflow hole is formed substantially adjacent to the substrate insertion slot of the substrate of the housing.

9 Claims, 3 Drawing Sheets

LIGHT DEFLECTOR

BACKGROUND OF THE INVENTION

1. Field of the Invention

The present invention relates to a light deflector which incorporates a rotating polygonal mirror having a plurality of mirrors around it to deflect a light beam and scan an image formation member or a recording member with the deflected beam.

2. Discussion of the Related Art

Generally, in an image reading apparatus which scans an image formation member with a light beam radiating from a light source such as a laser to read an image on the image formation member, or in an image recording apparatus which scans a recording medium with a light beam modulated by an image signal or character signal to record an image, a rotating polygonal mirror having a plurality of mirrors on its side faces is used as a means of scanning with the light beam.

One example of this type of light deflector is known: a light deflector comprising a driving shaft bearing, in particular preferably a dynamic pressure air bearing which has a shaft inserted into a sleeve, one of the sleeve and shaft being a rotation member and the other a fixed member and having a permanent magnet fixed on the rotation member, an electromagnetic circuit made by winding a coil on an iron ring installed near the fixed member, wherein the permanent magnet and the electromagnetic circuit generate rotation torque and the electromagnetic circuit functions as a magnetic bearing supporting the rotation member in an axial direction.

FIG. 6 illustrates the construction of an image recording apparatus employing this type of light deflector. 61 is a drive motor, 62 is a rotation polygon mirror, 63 is one of the mirrors constituting the rotating polygonal mirror 62, 64 is a mirror cover, 65 is an aperture for letting the light beam in and out, 66 is a laser, 67 is a collimator lens, 68 is a converging optical system and 69 is a light-sensitive member.

In the figure, the rotating polygonal mirror 62 is rotated by the drive motor 61 in the direction indicated by an arrow (A). A light beam radiates from the laser 66, which may be a semiconductor laser, a gas laser or the like, is modulated by a modulation means (not shown in the figure) with an image signal etc., and is incident on the mirror 63 of the rotating polygonal mirror 62.

The light beam reflected by the mirror 63 of the rotating polygonal mirror 62 is incident on the light-sensitive member 69 through the converging optical system 68.

As the rotating polygonal mirror 62 rotates in the direction indicated by the arrow (A), the reflected light beam is deflected in the direction indicated by an arrow (B) and the light-sensitive member 69 is scanned with it. At the same time, the light-sensitive member 69 is moved to perform a slow scan by rotating in the direction indicated by an arrow (C), whereby a two-dimensional image is formed on the light-sensitive member 69. The light deflector may have also a mirror cover 64 with aperture 65 for letting the light beam in and out to prevent dust from the air attaching to the mirrors 63 of the rotating polygonal mirror 62.

FIG. 7 is a sectional view illustrating the construction of the light deflector used in the above-described image recording apparatus or an image reading apparatus.

In the figure, 1 is a fixed shaft, 1-1 are grooves for forming a dynamic pressure air bearing, 2 is a housing, 3 is a rotation sleeve, 4 is a mirror flange, 5 is a magnet yoke, 6 is an inner magnet, 7 is an outer magnet, 8 is a stator core, 9 is a substrate fixing stud, 10 is a circuit substrate on which a drive control circuit or the like is mounted, 11 is a magnetic field detecting element, 12, 14, 17, 23 and 25 are screws, 13 is a stud for fixing the stator core 8, 62 is a rotating polygonal mirror, 16 is a cap flange, 18 is a very small aperture formed in the cap flange 16, 19 is an air reservoir, 20 is a spacing between the rotation sleeve 3 and fixed shaft 1, 21 is a housing adaptor for mounting the light deflector on the frame of the apparatus, 22 is a damper, 24 is a collar and 63 is a mirror facet.

In the figure, one end of the shaft 1 (in this figure, the lower end of the shaft) is fixed to the housing 2. On the surface of the fixed shaft 1 are formed grooves 1-1 for forming the dynamic pressure air bearing which functions as a radial bearing, which prevents shifting of the center of rotation from its predetermined position when the fixed shaft 1 is affected by a force at a right angle to it.

A rotor portion constituting a rotating drive portion is the portion mounted around the fixed shaft 1 with the spacing 20, namely, the rotation sleeve 3, the mirror flange 4 fixed to the rotation sleeve 3 by press fitting, adhesion or the like, the magnet yoke 5, the inner magnet 6 and the outer magnet 7.

The rotating polygonal mirror 62 is installed on the rotor portion by inserting the rotation sleeve 3 into a center hole of the rotating polygonal mirror 62, covering them with the cap flange 16 and fixing the cap flange 16 on the rotation sleeve 3 by the screw 17. At the same timer an air reservoir 19 is formed to provide a damping effect in the axial direction of the shaft 1.

The stator portion of the rotation drive principally comprises the housing 2, the shaft 1 one end of which is fixed into the housing 2 by press fitting or the like, the toroidal stator core 8 fixed on the housing 2 by the stud 13 for fixing the stator core 18 and the screw 14, the substrate 10 supported by the substrate fixing stud 9 set on the stator core 8 and the magnetic field detecting element 11, for which a Hall element is suitable, mounted on the substrate 10.

On the housing 2, the housing adaptor 21 is fixed by the screw 23 and the substrate 10 is fixed by the collar 24 and screw 25.

The inner magnet 6 and outer magnet 7 are permanent magnets, and therefore a magnetic attraction force works between these magnets and the stator core 8 facing them. The magnetic attraction force prevents a relative movement of facing positions of the stator core 8 and these magnets in the axial direction of the fixed shaft 1.

That is to say, in FIG. 7, if the inner magnet 6 and outer magnet 7 shift upward, a component of the magnetic attraction force pulls down the rotor portion. If they shift downward, a component of the magnetic attraction force pulls up the rotor portion. Thus the inner magnet 6, outer magnet 7 and stator core 8 are held in a predetermined position facing one another by the influence of the magnetic attraction force. In other words, the inner magnet 6, outer magnet 7 and stator core 8 constitute a magnetic thrust bearing.

The magnetic field detecting element 11, for example, a Hall element, detects the flux of the outer magnet 7 to determine whether a north or south magnetic pole has passed in the rotation of the outer magnet 7.

A detection signal is transmitted to a control circuit (not shown in the figure) through a printed circuit on the substrate 10. Based on the detection signal, the control circuit determines the direction of the electrical current in the coils wound on the stator core 8. As a result, force is generated in such a direction that rotation continues by the mutual relationship between the inner magnet 6 and outer magnet 7. Like magnetic poles of the inner magnet 6 and the outer magnet 7 are arranged to face each other.

When the rotation sleeve 3 rotates, a high pressure air layer is generated around the fixed shaft 1, namely, in the space between the shaft 1 and the rotation sleeve 3. The rotation sleeve 3 is supported floating on the shaft 1, thus constituting the dynamic pressure air bearing.

The grooves 1-1 for generating the dynamic pressure are formed on the outer surface of the shaft 1 in the above example, but may be formed on the inner surface of the rotation sleeve 3.

The high pressure air layer maintains a fixed center of rotation of the rotor. For example, if the rotation sleeve 3 shifts to the right, the right side space in the rotation sleeve 3 is enlarged and the air pressure in the spacing is reduced. On the other hand, the left side space in the rotation sleeve 3 is narrowed and the air pressure in the space increases. The difference between air pressures in the right side space and left side space moves the rotation sleeve 3 to the left and finally it returns to its original position.

The rotating polygonal mirror 62 has the shape of a regular polygonal prism, with mirrors 63 on its side faces.

As illustrated in FIG. 6, an incident light beam from the laser or the like is reflected by a mirror surface of the rotating polygonal mirror 62. As the rotating polygonal mirror 62 rotates, the reflected light beam is gradually changed in direction, namely, deflected.

When the next mirror surface appears by rotation of the rotating polygonal mirror 62, the light beam is incident on it and deflected by this mirror surface in the same manner as by the previous mirror. Consequently the scanning with the reflective light beam is carried out within a certain angle range. The scanning speed depends on the rotation speed of the rotating polygonal mirror.

Another example of the conventional light deflector of this type is disclosed by Japanese Patent Application Unexamined Publication No. Sho. 62-231922 (1987).

However, in the light deflector according to the above-described conventional technique, high-speed rotation causes the temperature to rise severely which causes deterioration of rotation accuracy or an oscillation of the light deflector or even deterioration of performance of the whole optical apparatus.

In other words, this type of light deflector is required to rotate not only with high accuracy but also at high speed. To carry out the high speed rotation, it is necessary to make the motor, namely, the rotation drive portion work effectively so that the rise in temperature may be restrained to the minimum.

However, the conventional construction of the light deflector has limits to the capability to limit the heat generated in the rotation drive portion, and therefore dispersal of the heat should be considered.

The heat is principally generated in the stator core portion producing rotation torque, and accordingly the temperature rises considerably in this area. Sometimes a method for forced cooling of the light deflector from outside has been employed, but thereby the whole apparatus is inevitably bulky and expensive because of the cooling apparatus installed.

According to the construction of the light deflector shown in FIG. 7, generated heat stays around the stator core 8 due to the configuration of the magnet yoke 5 surrounding it, which prevents the heat from escaping, that is, impairs the heat radiation property. The temperature increases more and more as the rotation speed becomes higher and the performance and reliability of not only the light deflector but also peripheral apparatuses such as a laser oscillator or optical lens is damaged or impaired.

SUMMARY OF THE INVENTION

The present invention has been made in view of the above circumstances and has as an object to overcome the technical problems described above.

A further object of the present invention is to provide a light deflector which effectively cools a rotation drive portion including a stator core portion to restrain a rise in temperature.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the light deflector of this invention having a rotating polygonal mirror having mirrors on its side faces, a rotation sleeve fixed to the rotating polygonal mirror, a magnet yoke including magnets fixed to the rotation sleeve, a fixed shaft inserted into the rotation sleeve, a housing supporting the fixed shaft, a stator core fixed to the housing and constituting an electromagnetic circuit by magnetically interacting with the magnet yoke to generate rotation torquer and a substrate on which the stator core is mounted and a part of which is extended outside through a substrate insertion slot, is characterized in that at least one air hole is formed at least in the magnet yoke between the magnet yoke and stator core and an air inflow hole is formed substantially adjacent to the substrate insertion slot of the substrate of the housing.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

Preferred embodiments of a light deflector according to the present invention are now described in detail based on the drawings.

Figure 1:
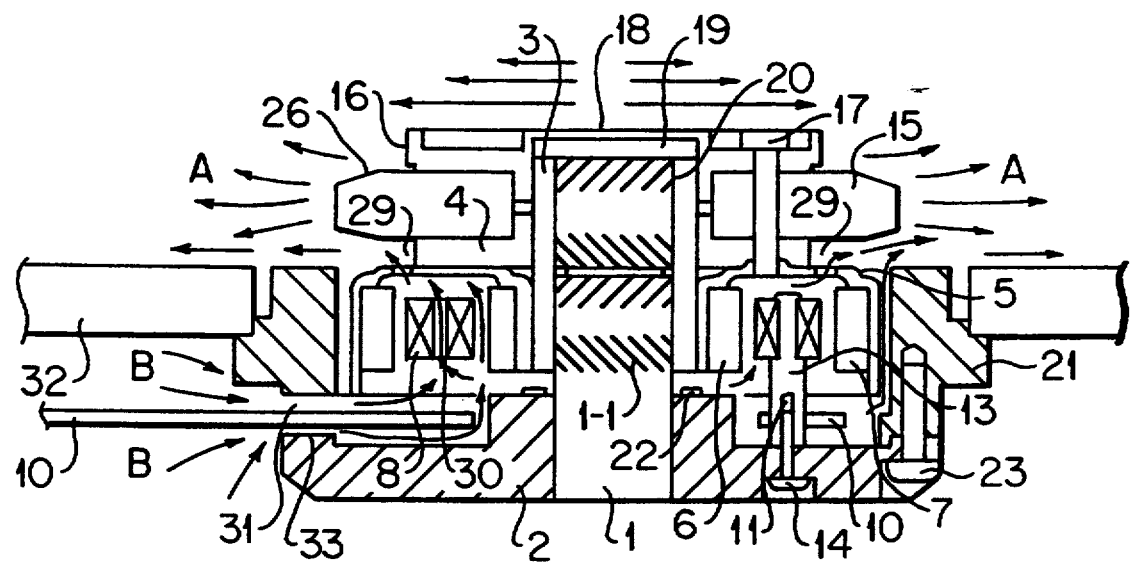
FIG. 1 is a cross section showing the construction of a first embodiment of the light deflector according to the present invention.

FIG. 1 is a cross section showing the construction of a first embodiment of the light deflector according to the present invention, where 1 is a fixed shaft, 1-1 are grooves forming a dynamic pressure air bearing, 2 is a housing, 3 is a rotation sleeve, 4 is a mirror flange, 5 is a magnet yoke, 6 is an inner magnet, 7 is an outer magnet, 8 is a stator core, 10 is a substrate on which drive control circuits and so forth are mounted, 11 is a magnetic field detecting element, 14, 17, and 23 are screws, 13 is a stud for fixing the stator core 8, 15 is a rotating polygonal mirror, 16 is a cap flange, 18 is a very small aperture formed in the cap flange 16, 19 is an air reservoir, 20 is a spacing between the rotation sleeve 3 and fixed shaft 1, 21 is a housing adaptor for mounting the light deflector on the frame of an apparatus, 22 is a damper, 26 is a mirror, 29 are air holes in the magnet yoke 5, 30 are air holes in the stator core 8, 31 is an air inflow hole, 32 is a frame and 33 is a substrate insertion slot.

Figure 2:
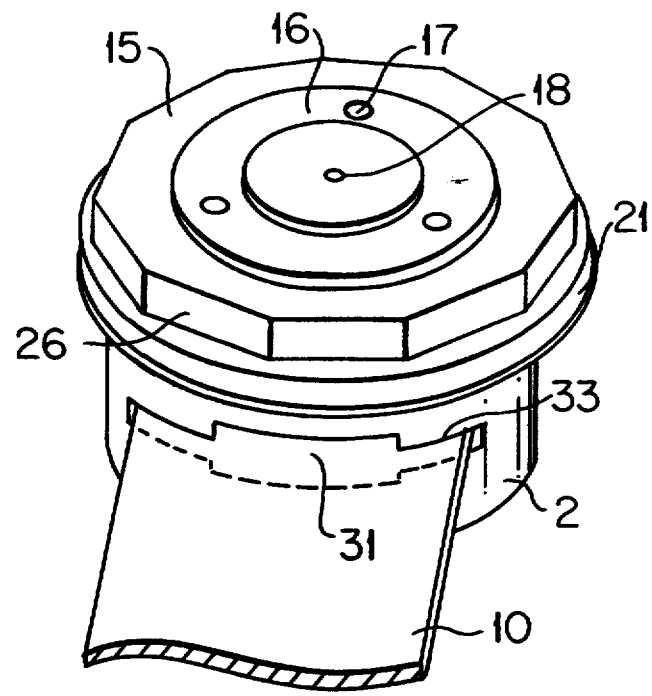
FIG. 2 is a perspective view illustrating the external appearance of the first embodiment of the light deflector according to the present invention.

FIG. 2 is a perspective view illustrating the external appearance of the first embodiment of the light deflector according to the present invention shown in FIG. 1, where components having the same reference numbers used in FIG. 1 are the same as those of FIG. 1.

Figure 7:
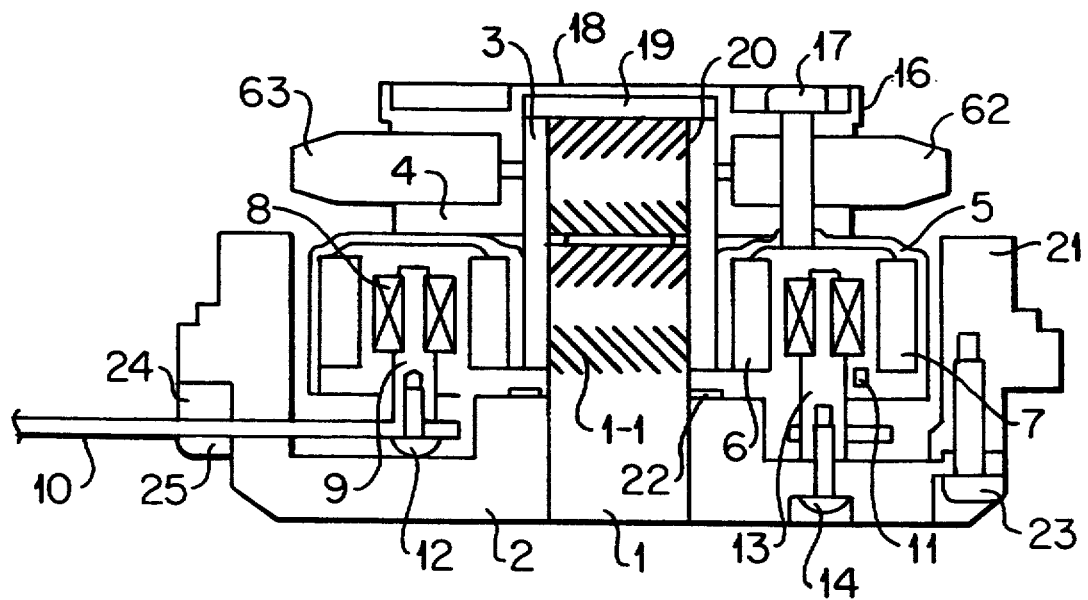
FIG. 7 is a cross section illustrating the construction of a conventional light deflector used in the image recording apparatus or image reading apparatus.

The operation of scanning with the light beam is basically the same as carried out by the conventional light deflector illustrated in FIG. 7. That is, as shown in FIG. 1, one end of the shaft 1 is fixed to the housing 2. A rotor portion forming the rotation drive portion comprises the rotation sleeve 3, the mirror flange 4 fixed to the rotation sleeve 3 by press fitting, adhesion or the like, the magnet yoke 5, the inner magnet 6 and the outer magnet 7.

The rotating polygonal mirror 15 is installed in the rotor portion by fitting the center hole of the rotating polygonal mirror 15 over the rotation sleeve 3, covering them with the cap flange 16, and fixing the cap flange 16 to the rotation sleeve 3 by the screw 17. The air reservoir 19 is thus formed to damp movement of the shaft 1 in the axial direction.

The stator portion of the rotation drive portion principally comprises the housing 2, the shaft 1 one end of which is fixed on the housing 2 by press fitting or the like, the stator core 8 fixed to the housing 2 by the stud 13 for fixing the stator core 8 and the screw 14, the substrate 10 supported by the substrate fixing stud 9 installed in the stator core 8 and the magnetic field detecting element 11, for which a Hall element is preferable, mounted on the substrate 10.

Moreover, the housing adaptor 21 is fixed to the housing 2 by the screw 23 and the substrate 10 is also fixed to the housing 2 by the screw 25 through the collar 24. The inner magnet 6 and the outer magnet 7 are permanent magnets. Magnetic attraction force works between these magnets and the stator core facing them to prevent shifting of the facing position of these magnets and the stator core 8 in the axial direction of the shaft 1.

In other words, if the inner magnet 6 and the outer magnet 7 shift upward, a component of the magnetic attraction force pulls down the rotor portion. If the magnets shift downward, a component of the magnetic attraction force pulls up the rotor portion. Thus the inner magnet 6, outer magnet 7 and the stator core 8 are held to be in a predetermined position in the axial direction facing one another by the influence of the magnetic attraction force, that is, the inner magnet 6, outer magnet 7 and the stator core 8 constitute a magnetic thrust air bearing.

The magnetic field detecting element 11, for example, a Hall element, detects the flux of the outer magnet 7 to determine whether a north or south magnetic pole has passed in the rotation of the outer magnet 7.

A detection signal is transmitted to a control circuit (not shown in the figure) through a printed circuit on the substrate 10. Based on the detection signal, the control circuit determines the direction of the electrical current in the coils wound on the stator core 8. As a result, force is generated in such a direction that rotation continues by mutual relationship between the inner magnet 6 and outer magnet 7. Like magnetic poles of the inner magnet 6 and the outer magnet 7 are arranged to face each other.

When the rotation sleeve 3 rotates, a high pressure air layer is generated around the fixed shaft 1, namely, in the space between the shaft 1 and the rotation sleeve 3 by the grooves 1-1 for generating the dynamic pressure. The rotation sleeve 3 is supported floating on the shaft 1, thus constituting the dynamic pressure air bearing.

The grooves 1-1 for generating the dynamic pressure are formed on the outer surface of the shaft 1 in this embodiment, but may be formed on the inner surface of the rotation sleeve 3.

The high pressure air layer maintains a fixed center of rotation of the rotor. For example, if the rotation sleeve 3 shifts to the right, the right side space in the rotation sleeve 3 is enlarged and the air pressure in the space is reduced. On the other hand, the left side space in the rotation sleeve 3 is narrowed and the air pressure in the space increases. The difference between air pressures in the right side space and left side space moves the rotation sleeve 3 to the left and finally it returns to its original position.

The rotating polygonal mirror 15 has the shape of a regular polygonal prism, with mirrors 26 on its side faces.

An incident light beam from the laser or the like is reflected by a mirror surface of the rotating polygonal mirror 15. As the rotating polygonal mirror 15 rotates, the reflected light beam is gradually changed in direction, namely, deflected.

When the next mirror surface appears by rotation of the rotating polygonal mirror 15, the light beam is incident on it and deflected by this surface in the same manner as by the previous mirror. Consequently the scanning with the reflective light beam is carried out within a certain angle range. The scanning speed depends on the rotation speed of the rotating polygonal mirror.

The air inflow hole 31 is formed substantially adjacent to the substrate insertion slot 33 of the housing 2, which is one component of the light deflector, to admit air from the outside.

The air holes 30 in the stator core 8 are formed in the stator core 8 and the air holes 29 in the magnet yoke 5 are formed in the magnet yoke 5. Air circulates through the air inflow hole 31, the air holes 30 in the stator core 8 and the air holes 29 in the magnet yoke 5 described above.

In such a construction, as the rotating polygonal mirror 15 rotates, air currents indicated in the figure by an arrow (A) are generated around the rotating polygonal mirror 15 by air viscosity. These air currents produce a negative pressure inside the light deflector, which draws in air through the air inflow hole 31 around the substrate insertion slot 33 of the housing 2 as indicated in the figure by an arrow (B).

The air drawn in passes through the air holes 30 in the stator core 8 and the air holes 29 in the magnet yoke 5 and is expelled radially from the space between the rotating polygonal mirror 15 and the magnet yoke 5 of the light deflector.

The air currents pass both sides of the stator core, outside of the inner magnet 6, inside of the outer magnet 7 and outside of the magnet yoke 5, cooling these portions.

The air holes 30 in the stator core 8 enlarge the surface area of the stator core 8 and thereby enhance the cooling effect for the stator core portion.

Figure 3:
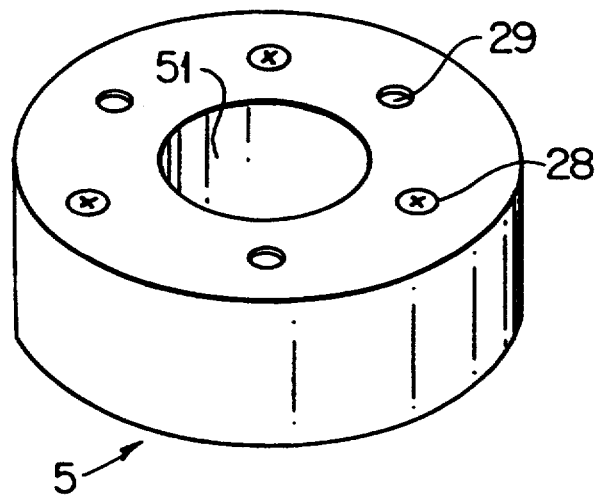
FIG. 3 is a perspective view schematically showing the magnet yoke in FIG. 1.

FIG. 3 is a perspective view schematically showing a magnet yoke in FIG. 1. In the figure, 51 is a central opening into which the rotation sleeve 3 is inserted.

In the figure, the inner magnet 6 and outer magnet 7 are fixed inside the magnet yoke 5 so that the inner magnet 6 and outer magnet 7 face the inner periphery and the outer periphery of the stator core 8, respectively. The rotation sleeve 3 is inserted into the central opening 51 of the magnet yoke 5 which is fixed to the mirror flange 4 by means of screw holes 28 and screws and is rotated. The number of air holes in the magnet yoke 5 and screw holes is not limited to three as shown in the figure.

Figure 4:
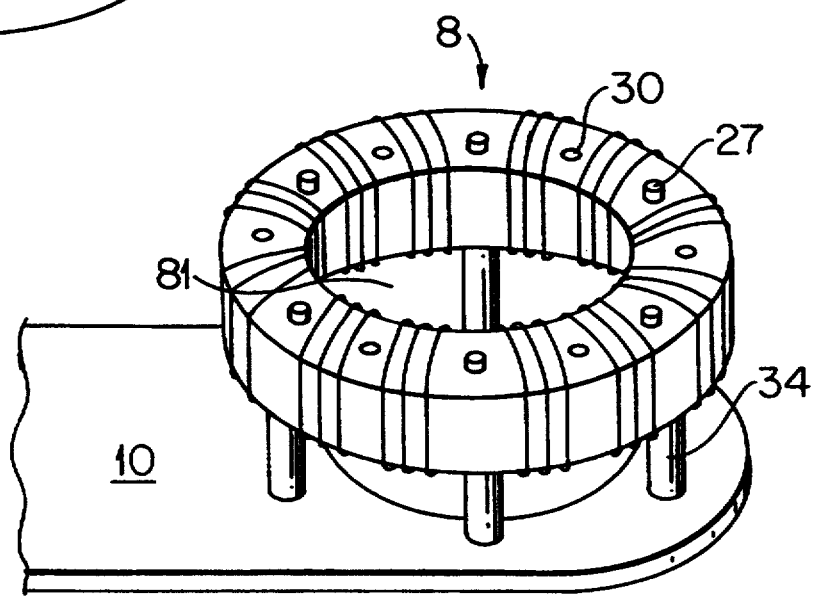
FIG. 4 is a perspective view schematically showing the stator core in FIG. 1.
Figure 6:
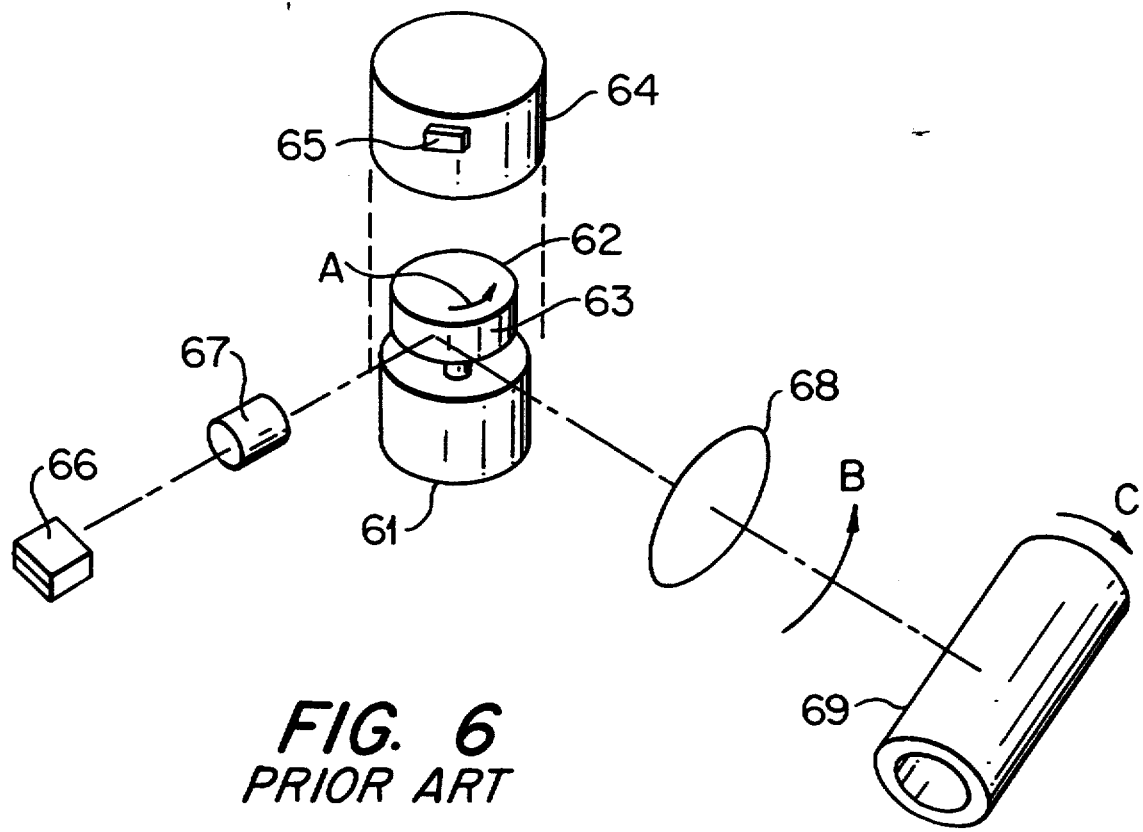
FIG. 6 schematically illustrates the construction of an image recording apparatus using a conventional light deflector.

FIG. 4 is a perspective view schematically illustrating the stator core 8 in FIG. 1, where 27 are coils wound toroidally on the stator core 8, 30 are air holes in the stator core, 81 is a central opening to which the rotation sleeve 3 is inserted and 34 is a stud for fixing the stator core 8 to the substrate 10.

The stator core 8 is fixed to the studs 34 mounted on the substrate 10 so that the inner magnet 6 and outer magnet may rotate in the central opening and around the periphery of the stator core 8, respectively.

In the figure, twelve toroidal coils 27 and six air holes in the stator core 30 are shown, but the number of the toroidal coils 27 may be determined as necessary, corresponding to the number of poles of the magnets mounted on the magnet yoke 5; the number of air holes in the stator core 30 may be determined within the limit of what is physically possible according to the number of the toroidal coils 27 and the studs 34.

Figure 5:
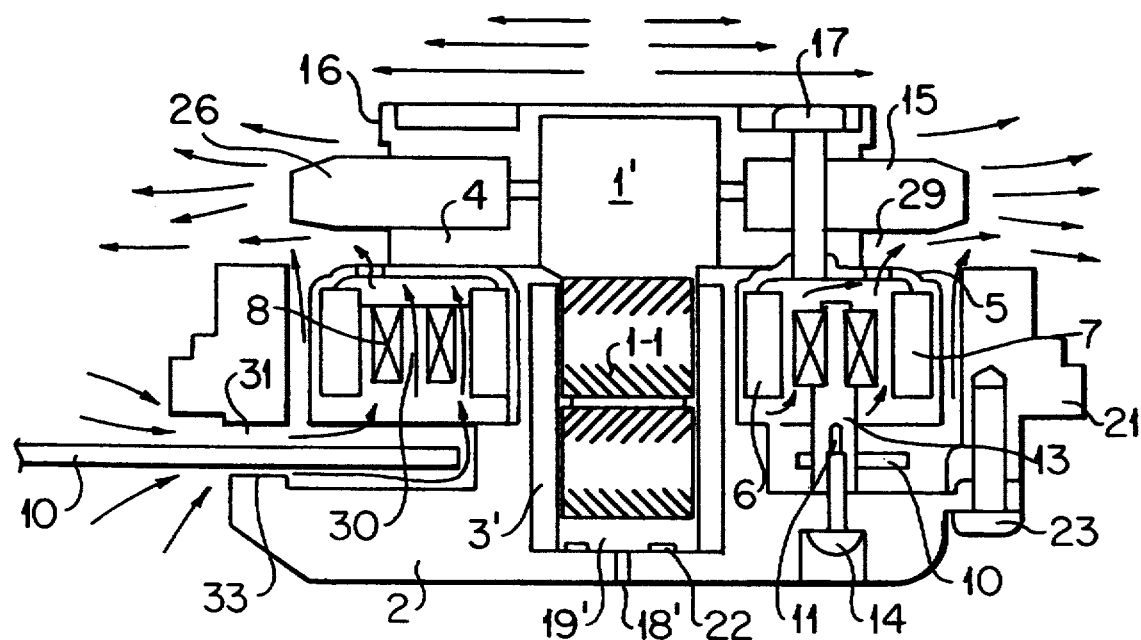
FIG. 5 is a cross section showing the construction of a second embodiment of the light deflector according to the present invention.

FIG. 5 is a cross section illustrating the construction of the second embodiment of the light deflector according to the present invention. In the figure, the same reference numbers as those used in FIG. 1 indicate the same portions shown in FIG. 1. 1' is a rotation shaft, 3' is a fixed sleeve which is fixed to the housing 2, 18' is a small hole formed at the center of the housing 2 and 19' is an air reservoir formed under the rotation shaft 1'.

Explanation of the operation of this embodiment is omitted because it is substantially the same as that of the first embodiment except that the rotation shaft 1' is fixed to the rotating polygonal mirror 15 and the sleeve 3' is fixed to the housing 2.

As the description of the above-embodiments shows, by forming the air holes 29 in the magnet yoke 5, air holes 30 in the stator core 8 and the air inflow hole 31 substantially adjacent to the substrate insertion slot 33, as the rotating polygonal mirror rotates, portions including the magnet yoke and stator core which generates driving torque can be effectively cooled, and air carrying heat is expelled; therefore it is possible to limit the rise in temperature.

In either embodiment a spacing between the magnet yoke 5 and the housing adaptor 21 also allows air to pass and cool the entire space inside the light deflector.

As explained above, the light deflector according to the present invention generates a negative pressure inside the light deflector utilizing air viscosity around the rotating polygonal mirror as it rotates, and the outside air is drawn in by the negative pressure and passes through the heated portions to expel air carrying heat from the light deflector and cool the inside of the light deflector without installing a special device, and in particular the heated air around the stator core portion is expelled; therefore the rise in temperature is limited.

Accordingly, it is possible to prevent thermal deformation or changing in characteristics of not only the light deflector, but also of the peripheral apparatus such as a laser oscillator or an optical lens caused by a rise in temperature and to maintain their performance and reliability. Moreover, there is no need to employ a method of forced cooling from the outside; consequently it is also unnecessary to make the apparatus bulky and to add a cooling device, which makes easier to reduce costs and make the light deflector compact.

The present invention is not limited to be applied to a light deflector employing a dynamic pressure air bearing as the bearing and it may be applied to a light deflector employing other bearings.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A light deflector comprising a rotational polygonal mirror having mirrors on its side faces a rotation sleeve fixed to the rotating polygonal mirror; a magnet yoke including magnets and fixed to the rotation sleeve; a fixed shaft inserted into the rotation sleeve; a housing supporting the fixed shaft; a stator core fixed to the housing and constituting an electromagnetic circuit by magnetically interacting with the magnet yoke to generate rotation torque; and a substrate on which the stator core is mounted and a part of which is extended outside through a substrate insertion slot, wherein:

at least one air hole is formed in said magnet yoke and an air inflow hole is formed substantially adjacent to said substrate insertion slot of said housing.

2. A light deflector comprising a rotating polygonal mirror having mirrors on its side faces; a rotation shaft fixed to the rotating polygonal mirror; a magnet yoke including magnets and fixed to the rotation shaft; a fixed sleeve surrounding the rotation shaft; a housing supporting the fixed sleeve; a stator core fixed to the housing and constituting an electromagnetic circuit by magnetically interacting with the magnet yoke to generate a rotation torque; and a substrate on which the stator core is mounted and a part of which is extended outside through a substrate insertion slot, wherein:

at least one air hole is formed in said magnet yoke and an air inflow hole is formed substantially adjacent to said substrate insertion slot of said housing.

3. A light deflector comprising:
a rotating polygonal mirror having a plurality of mirrors;
a rotation sleeve to which said rotating polygonal mirror is fixed;
a shaft about which said rotation sleeve rotates;
a housing spporting said shaft and disposed under said rotating polygonal mirror at a spacing therefrom;
a magnet yoke attached to said rotation sleeve;
magnets fixed to said magnet yoke; and
a stator core arranged to constitute an electromagnetic circuit for generating rotation torque with said magnets, said stator core having holes for cooling the stator core.

4. A light deflector according to claim 3, wherein said housing has an air hole for cooling.

5. A light deflector according to claim 1, wherein said magnet yoke is a cup shaped body having holes for cooling and arranged to cover said stator core.

6. A light deflector comprising:
a rotating polygonal mirror having a plurality of mirrors;
a rotation sleeve to which said rotating polygonal mirror is fixed;
a shaft about which said rotation sleeve rotates;
a housing supporting said shaft and disposed under said rotating polygonal mirror at a spacing therefrom;
a cup-shaped magnet yoke attached to said rotation sleeve and having holes for cooling the magnet yoke;
magnets fixed to said magnet yoke; and
a stator core covered by the magnet yoke and arranged to constitute an electromagnetic circuit for generating rotation torque with said magnets, said stator core having holes for cooling the stator core.

7. A light deflector according to claim 6, wherein said housing has an air hole for cooling.

8. A light deflector according to claim 1, wherein said stator core has at least one air hole.

9. A light deflector according to claim 2, wherein said stator core has at least one air hole.

* * * * *

UNITED STATES PATENT AND TRADEMARK OFFICE
CERTIFICATE OF CORRECTION

PATENT NO. : 5,430,570
DATED : July 04, 1995
INVENTOR(S) : Masahiro TAKAHASHI

It is certified that error appears in the above-indentified patent and that said Letters Patent is hereby corrected as shown below:

Claim 1, column 8, line 59 after "faces" insert --;--.

Claim 3, column 9, line 26 change "spporting" to --supporting--.

Signed and Sealed this

Second Day of April, 1996

BRUCE LEHMAN

*Attest:*

*Attesting Officer*   *Commissioner of Patents and Trademarks*